US012643280B2

(12) United States Patent
Patz et al.

(10) Patent No.: US 12,643,280 B2
(45) Date of Patent: Jun. 2, 2026

(54) DEEP-DRAWING PACKAGING MACHINE AND METHOD FOR PRODUCING A PERFORATION

(71) Applicant: MULTIVAC SEPP HAGGENMUELLER SE & CO. KG, Wolfertschwenden (DE)

(72) Inventors: Dominik Patz, Kempten (DE); Florian Ferk, Bad Groenenbach (DE); Markus Weiland, Bad Groenenbach (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 211 days.

(21) Appl. No.: 18/233,084

(22) Filed: Aug. 11, 2023

(65) Prior Publication Data

US 2024/0051215 A1      Feb. 15, 2024

(30) Foreign Application Priority Data

Aug. 12, 2022    (DE) .......................... 102022120395.6

(51) Int. Cl.
B29C 51/26          (2006.01)
B29C 51/08          (2006.01)
(Continued)

(52) U.S. Cl.
CPC ............ B29C 51/265 (2013.01); B29C 51/08 (2013.01); B29C 51/261 (2013.01); B65B 47/02 (2013.01);
(Continued)

(58) Field of Classification Search
CPC ..... B29C 51/265; B29C 51/08; B29C 51/261; B29C 2793/0045; B65B 47/02; B65B 47/04; B65B 61/02; B65B 61/06
(Continued)

(56) References Cited

U.S. PATENT DOCUMENTS

| | | | |
|---|---|---|---|
| 8,615,973 | B2 | 12/2013 | Mondry et al. |
| 10,633,133 | B2 | 4/2020 | Schiche et al. |
| | | (Continued) | |

FOREIGN PATENT DOCUMENTS

| | | |
|---|---|---|
| DE | 10 2011 010 601 A1 | 8/2012 |
| DE | 10 2018 214 760 A1 | 3/2020 |
| EP | 3 192 641 B1 | 6/2021 |

OTHER PUBLICATIONS

German Search Report Dated Jul. 17, 2023, Application No. 10 2022 120 395.6, Applicant Multivac Sepp Haggenmüller SE & Co. KG, 5 Pages.

*Primary Examiner* — Veronica Martin
*Assistant Examiner* — Mary C Hibbert-Copeland
(74) *Attorney, Agent, or Firm* — Brooks Kushman P.C.

(57)          ABSTRACT

The disclosure relates to a deep-drawing packaging machine comprising a work station for heating a lower film for a forming process and lateral transport chains configured to grip the lower film laterally and to transport the lower film intermittently through the work station in a working direction. The work station has a height-adjustable tool lower part, a tool upper part with a heating body for heating the lower film, and a punching device with a punching unit for producing a perforation in an edge strip area of the lower film. The punching unit comprises a punch provided on the tool lower part and a hold-down device for interacting with the punch and provided on the tool upper part. The punch has a punch body with an outer edge area facing a lateral transport chain and with an inner edge area facing the heating body.

20 Claims, 6 Drawing Sheets

(51) Int. Cl.

| | |
|---|---|
| *B65B 47/02* | (2006.01) |
| *B65B 47/04* | (2006.01) |
| *B65B 61/02* | (2006.01) |
| *B65B 61/06* | (2006.01) |

(52) U.S. Cl.
CPC .............. *B65B 47/04* (2013.01); *B65B 61/02* (2013.01); *B65B 61/06* (2013.01); *B29C 2793/0045* (2013.01)

(58) Field of Classification Search
USPC ....................................................... 53/329.2
See application file for complete search history.

(56) References Cited

U.S. PATENT DOCUMENTS

| | | | |
|---|---|---|---|
| 11,059,615 B2 | 7/2021 | Mößnang et al. | |
| 2014/0237942 A1* | 8/2014 | Geble ..................... | B65B 47/06 |
| | | | 29/401.1 |
| 2017/0197746 A1* | 7/2017 | Schiche ................ | B29C 51/082 |
| 2018/0222619 A1* | 8/2018 | Ehrmann ................ | B65B 51/10 |

* cited by examiner

DEEP-DRAWING PACKAGING MACHINE AND METHOD FOR PRODUCING A PERFORATION

CROSS REFERENCE TO RELATED APPLICATIONS

This application claims foreign priority benefits under 35 U.S.C. § 119(a)-(d) to German patent application number DE 10 2022 120 395.6, filed Aug. 12, 2022, which is incorporated by reference in its entirety.

TECHNICAL FIELD

The disclosure relates to a deep-drawing packaging machine and to a method on a deep-drawing packaging machine for producing a perforation.

BACKGROUND

Such a deep-drawing packaging machine is known from DE 10 2018 214 760 A1.

Conventional deep-drawing packaging machines generally have a forming station, a sealing station, a transverse cutting device and a longitudinal cutting device. These are arranged in this order in one working direction on a machine frame. A lower film web is gripped laterally by transport chains at the input to the deep-drawing packaging machine and transported in the working direction. An area of the lower film web is heated, for example, with a heating plate of the forming station or a preheating station, and troughs or packaging troughs are deep-drawn into the lower film web in the forming station. After the troughs have been filled, they are transported to the sealing station. In the sealing station, an evacuation and gas flushing process takes place. For these processes, a lateral perforation is provided on the edge strip of the lower film web. The term "perforation" can be understood to mean several apertures or openings spaced apart in the working direction. Gases can be blown into the troughs through the individual apertures and sucked out of the troughs. For example, punching units are provided in the forming station or in the preheating station between one of the lateral transport chains and the heating plate of the forming station for introducing the perforation.

One of the problems of conventional deep-drawing packaging machines is that lateral expansion of the heating area or the width of the heating plate is limited by the lateral transport chains. Generally speaking, the lateral transport chains determine the width of the forming station and thus also the dimension of the heating plate accommodated therein. This limits the heating area of the lower film web and causes the formation of cold/warm zones near the deep-drawing process, where wave formations can occur in the lower film web. The wave formations can impair the sealing process.

Furthermore, the heating plates of the conventional deep-drawing packaging machines must be adapted according to the specific packaging formats or packaging shapes and packaging configurations, or even extended in some lateral/longitudinal areas with regard to tear-off corners. For example, a rectangular heating plate for heating a lower film with packaging troughs comprising an ear-shaped area (for forming offset corners or tear-off corners) may not be sufficient to cover the ear-shaped area. In this case, the heating plate must also specifically have such an ear-shaped area. This requires a new division/grouping of the apertures of the perforation or a new elongated division/grouping of the punching units so that the punching units do not collide with the heating plate. For this, the heating plates and the punching units have to be customized for different packaging shapes, which involves considerable construction costs and expenditure of time.

In conventional deep-drawing packaging machines, the punching unit comprises a punch that is circular or oval in cross-section and a hold-down device arranged above and in the center of the punch, which are configured to make apertures or openings in the lower film web and tabs for the apertures. A tab is a part of the lower film, wherein the tab is connected to the lower film at an edge area of the respective aperture. The problem is that such laps can tip downwards (below the lower film) during the sealing process and partially prevent the evacuation and gassing process.

SUMMARY

The present disclosure provides a deep-drawing packaging machine and a method on a deep-drawing packaging machine for producing a perforation to eliminate one or more of the above-mentioned problems.

The disclosure relates to at least one work station for heating a lower film for a forming process and to lateral transport chains configured to grip the lower film laterally at the input to the deep-drawing packaging machine and to transport the lower film intermittently through the work station in a working direction. The work station has a height-adjustable lower tool part, an upper tool part positioned above it with at least one heating body for heating the lower film, and a punching device with at least one punching unit for producing at least one perforation in an edge strip area of the lower film. The punching unit has at least one punch, which is provided on the lower part of the tool, and at least one hold-down device, which cooperates with the punch and is provided on the upper part of the tool. The punch has a punch body with an outer edge area facing the lateral transport chain and with an inner edge area facing the heating body. The hold-down device is arranged at least partially between one of the lateral transport chains and the heating body. According to the disclosure, the hold-down device is positioned further towards the outer edge area of the punch body than towards the inner edge area of the punch body. The outer edge area of the punch body faces the lateral transport chain closest to the punch. The tool lower part can be adjustable by means of a lifting device. In order to fulfill the offset according to the disclosure, it can be sufficient if only the area of the hold-down device that comes into contact with the film is positioned further towards the outer edge area of the punch body than towards the inner edge area of the punch body.

The disclosure has the advantage that the punch can be configured narrower and thus the heating body wider transverse to the working direction. Accordingly, a larger lateral area of the lower films can be heated. In other words, heating of the entire packaging format can be extended to the cutting dimension (packaging edge or longitudinal cut) and beyond to enable optimum heating and forming of the film web. This prevents the formation of waves in the lower film in the deep-drawing area, especially in the case of films made of mono-materials, e.g., polypropylene, in the area of the sealing seam.

The disclosure also allows the shape/size of the heating body and the arrangement of the punching units to be standardized so that they, and in particular the heating body with uniform dimensions, can be used, for example, as a rectangular plate for any packaging configuration.

The disclosure further allows a tab formed at an aperture to be deformed and aligned such that it reliably remains folded up above the lower film during a sealing process or during the evacuation and/or gassing process.

In a preferred embodiment, the tool upper part has a cavity into which at least a portion of the hold-down device extends, wherein a central axis of the hold-down device is arranged closer to an outer edge of the cavity than a central axis of the cavity. The off-center positioning of the hold-down device within the cavity provides the ability to dimension the heater plate wider. The cavity may have an inner edge area facing the heating body.

In a preferred embodiment, the punch has a depression that is at least partially surrounded by the punch body. The punch body may include a punch body head and a punch body support. The depression may be a cavity formed in the punch body head. The depression may be configured to accommodate a portion of the hold-down device during the punching process.

In a preferred embodiment, the outer edge area of the punch body has a recess for the hold-down device. The recess can merge directly into the depression. The hold-down device or at least a lower portion of the hold-down device can enter the recess of the punch body during the punching process.

Preferably, the inner edge area of the punch body, i.e., an area facing the heating plate, has a pointed cutting blade which extends up to the recess in the outer edge area. By means of the pointed cutting blade, an aperture can be made in the lower film. In the area of the recess, the lower film can be kept intact. In the area of the recess, the lower film can be deformed. This allows an upward standing deformed tab to be formed at the respective apertures. The deformed tab can have a concave or V-shaped form, which allows it to remain stably aligned. The deformed tab can remain aligned above the lower film during a sealing process.

It is preferred if the punch body is configured with an oval or elliptical cross-sectional shape, in particular with a width of 3 to 6 mm, more preferably with a width of 5.5 mm. Due to the oval or elliptical cross-sectional shape, in particular due to a displacement of the hold-down device to an outer edge area of the punch body facing the lateral transport chain, the punch body can be configured narrower transversely to the working direction, which creates more installation space for the heating plate.

In a preferred embodiment, the work station is a forming station for forming troughs in the lower film. This can allow a compact structure for the deep-drawing packaging machine and work steps such as heating, forming and punching of the lower film can take place in the same work station.

According to a particular embodiment, the work station is a preheating station for heating the lower film, wherein the preheating station is mounted upstream of the forming station in the working direction. The preheating station can be configured as a heating chamber, possibly directly at the input to the forming station, which has an upper and lower heating plate. The preheating station allows the lower film to be heated uniformly for deep-drawing.

Preferably, the heating body is in the form of a rectangular heating plate. A rectangular heating plate can be easily manufactured and used for a uniform forming station for different packaging formats.

In a particularly efficient embodiment, the punching device comprises several punching units positioned at equal distances from one another in the working direction. This allows several apertures to be introduced in the lower film at the same time. A number of punching units, preferably two to four punching units, can be arranged along the working direction in a right-hand edge strip area of the lower film. A number of punching units, preferably two to four punching units, can be arranged along the working direction in a left-hand edge strip area of the lower film. The number of punching units and/or the distances between the punching units can be adapted independently of the packaging format.

Preferably, the deep-drawing packaging machine has a longitudinal cutting device for producing a lateral longitudinal cut in the lower film, wherein the heating body of the work station is dimensioned such that the lower film can be heated beyond the lateral longitudinal cut. The lower film can be heated 2 to 10 mm, preferably 3 to 5 mm, beyond the lateral longitudinal cut.

The disclosure further relates to a method on a deep-drawing packaging machine for producing a perforation with a plurality of apertures, elongated in a working direction of the deep-drawing packaging machine, in an edge strip area of a lower film fed to the work station by means of lateral transport chains in the working direction by means of a punching device integrated within the work station.

Advantageously, during a punching stroke performed by means of the punching device, a hold-down device of the punching device positioned above the lower film is at least partially immersed in a recess of a punch positioned below the lower film, so that deformed tabs erected outwardly towards the transport chains are formed at the respective apertures.

All of the features disclosed in connection with the deep-drawing packaging machine according to the disclosure may be used individually or together in the method on a deep-drawing packaging machine for producing a perforation according to the disclosure. All of the features disclosed in connection with the method according to the disclosure on a deep-drawing packaging machine for producing a perforation may be used individually or together in the deep-drawing packaging machine according to the disclosure.

BRIEF DESCRIPTION OF THE DRAWINGS

In the following, exemplary embodiments are explained with reference to the Figures.

DETAILED DESCRIPTION

Figure 1:
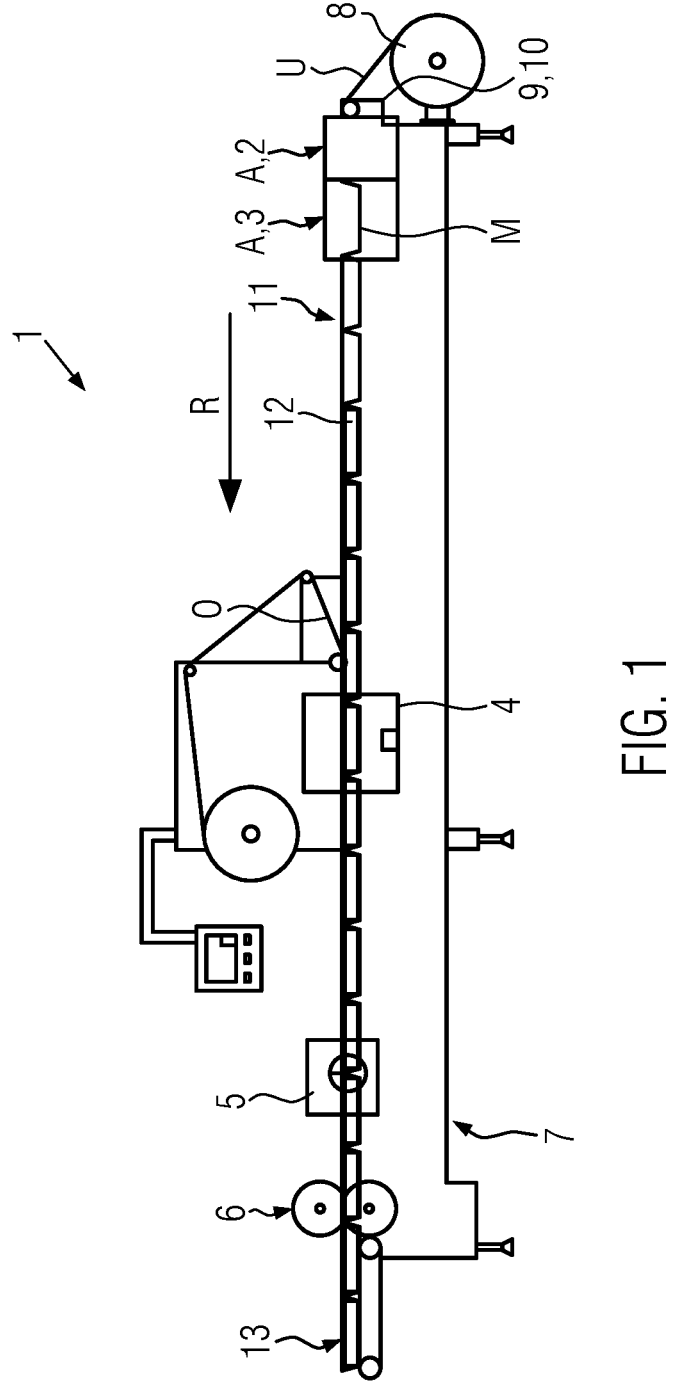
FIG. 1 shows a schematic side view of a deep-drawing packaging machine.

FIG. 1 shows a schematic view of a deep-drawing packaging machine 1. The deep-drawing packaging machine 1 comprises at least one work station A for heating a lower film U for a forming process. The deep-drawing packaging machine 1 comprises a preheating station 2, a forming station 3, a sealing station 4, a transverse cutting device 5 and a longitudinal cutting device 6. These are arranged in this order in a working direction R on a machine frame 7. The preheating station 2 and the forming station 3 are configured as separate work stations A in FIG. 1, but can also have an integrated structure, i.e., exist as a single work station A.

A feed roller 8 is attached to the machine frame 7 of the deep-drawing packaging machine 1 on the input side, from which a lower film U is drawn off. The lower film U is a web-shaped lower packaging material. Furthermore, the packaging machine 1 has a feed device 9 with lateral transport chains 10, which grip the lower film U and transport it further in a main working cycle, cycle by cycle in the working direction R.

In the forming station 3, a deep-drawing process takes place and as a result, troughs M are formed in the lower film U. The troughs M can be transported to an insertion track 11, where they can be filled manually or automatically with a product 12. Subsequently, the troughs M filled with the products 12 are transported further to the sealing station 4. By means of the sealing station 4, the troughs M can be sealed with an upper film O forming an upper packaging material, so that by sealing the upper film O onto the troughs M, closed packages V are produced, which can be separated by means of the transverse cutting device 5 and the longitudinal cutting device 6 and transported away by means of a discharge device 13.

Figure 2:
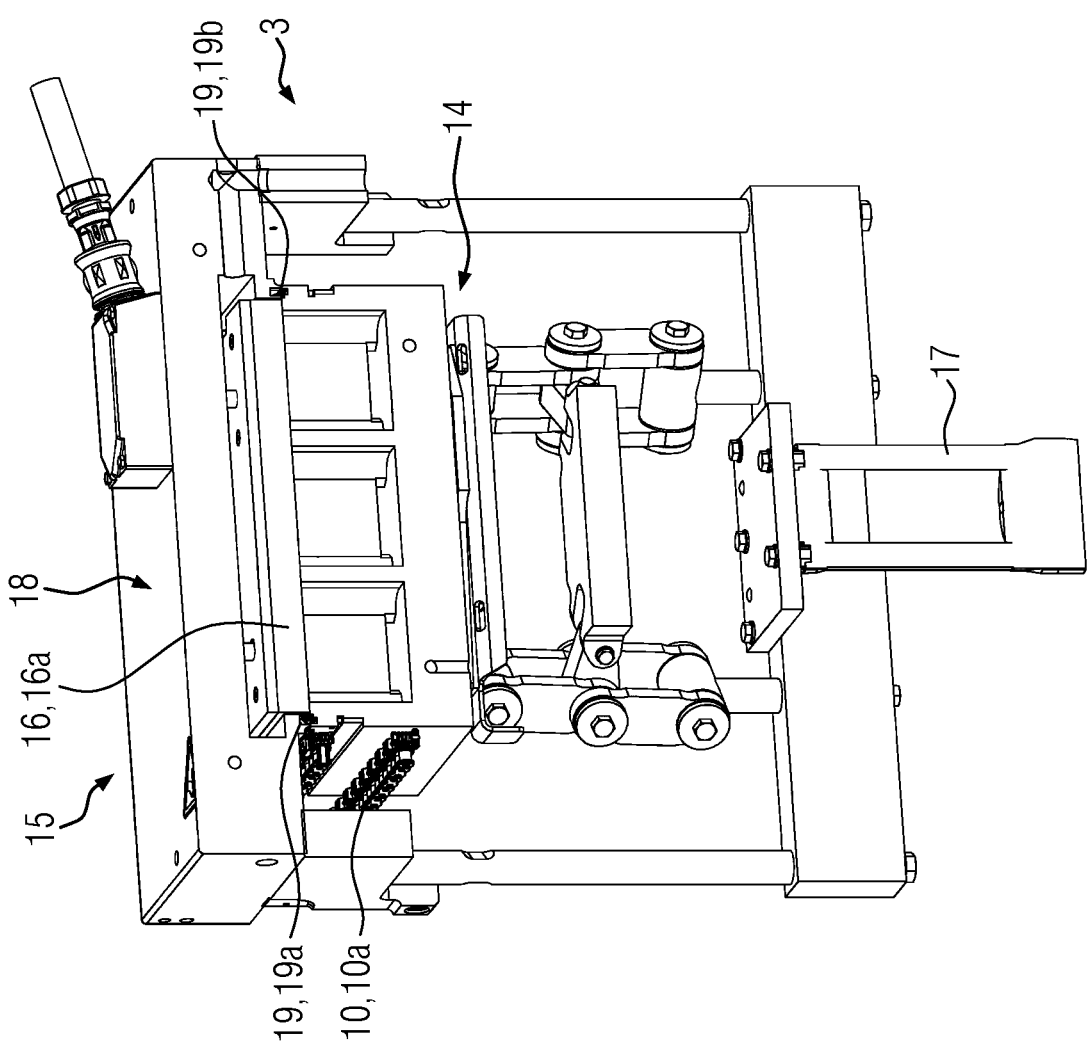
FIG. 2 shows a schematic perspective view of a working station of the deep-drawing packaging machine configured as a forming station.

FIG. 2 shows a schematic perspective view of the forming station 3. The forming station 3 has a height-adjustable tool lower part 14 and a tool upper part 15 positioned above it. The tool upper part 15 comprises a heating body 16 in the form of a heating plate 16a for heating the lower film U. The tool lower part 14 is moved with respect to the tool upper part 15 by means of a lifting device 17 so that a heating process, a forming process and a punching process take place. A first lateral transport chain 10a is also shown in FIG. 2.

The forming station 3 further comprises a punching device 18 with at least one punching unit 19 for producing a lateral perforation L (shown, for example, in FIG. 5) in the lower film U. The perforation L allows an atmosphere to be exchanged in the troughs during an evacuation and/or gassing process.

The punching device 18 may comprise several punching units 19. As shown in FIG. 2, a first punching unit 19a is arranged between the first lateral transport chain 10a and the heating plate 16a when viewed in cross-section. A second punching unit 19b is arranged between a second lateral transport chain (not shown) and the heating plate 16a when viewed in cross-section, i.e., on the opposite side.

Figure 3:
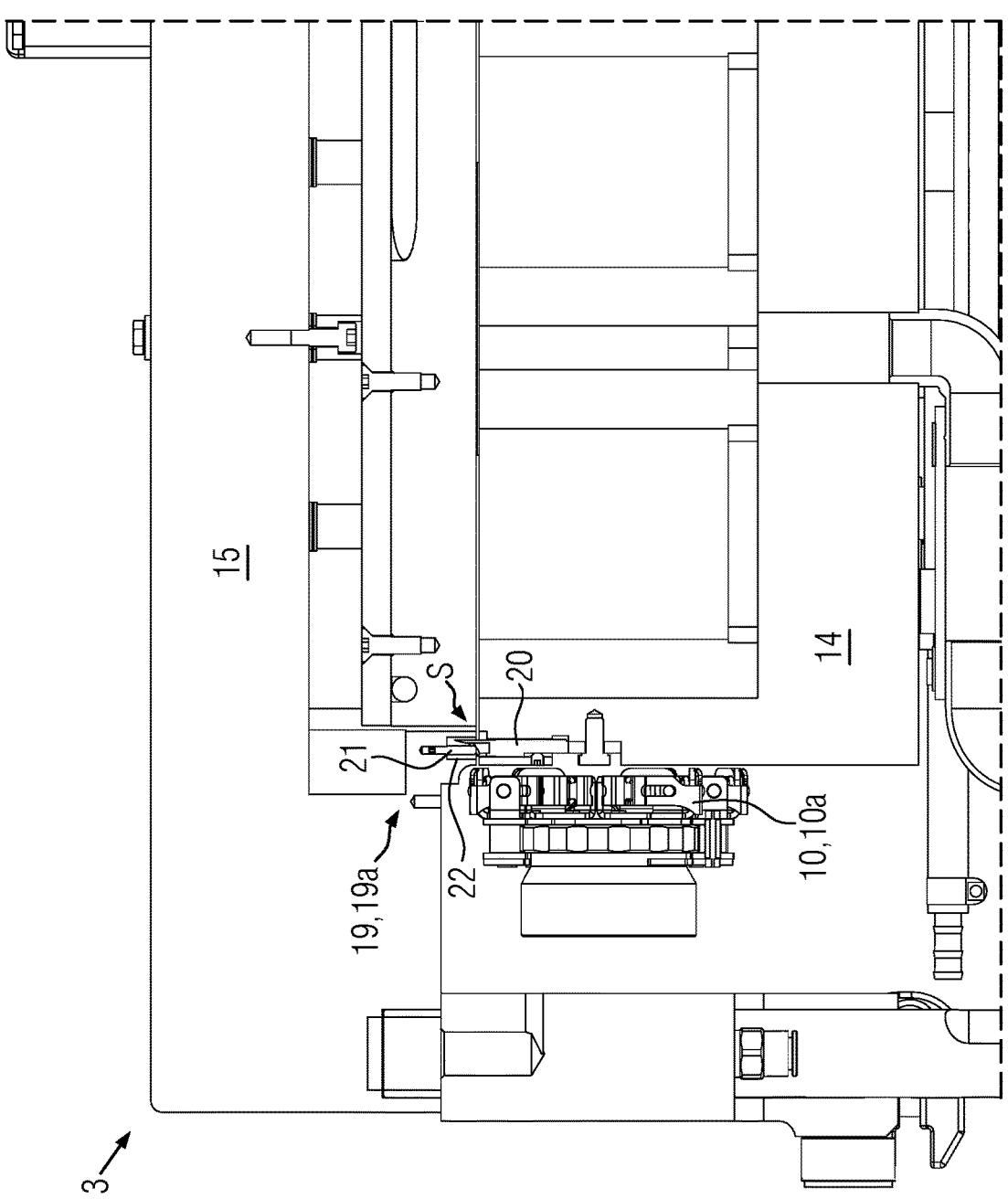
FIG. 3 shows a schematic partial view of the forming station and a punching unit of the forming station.

FIG. 3 shows a schematic partial view of the forming station 3 and the first punching unit 19. The punching unit 19 comprises a punch 20 which is provided on the tool lower part 14. The punching unit 19 comprises a hold-down device 21 interacting with the punch 20, which is provided on the tool upper part 15. FIG. 3 shows the forming station 3 in a state where the tool lower part 14 is moved towards the tool upper part 15. As a result, the punch 20 is partially retracted into a cavity 22 of the tool upper part 15 and moved towards the hold-down device 21. This brings the punch 20 and the hold-down device 21 into a punching position S.

Figure 4:
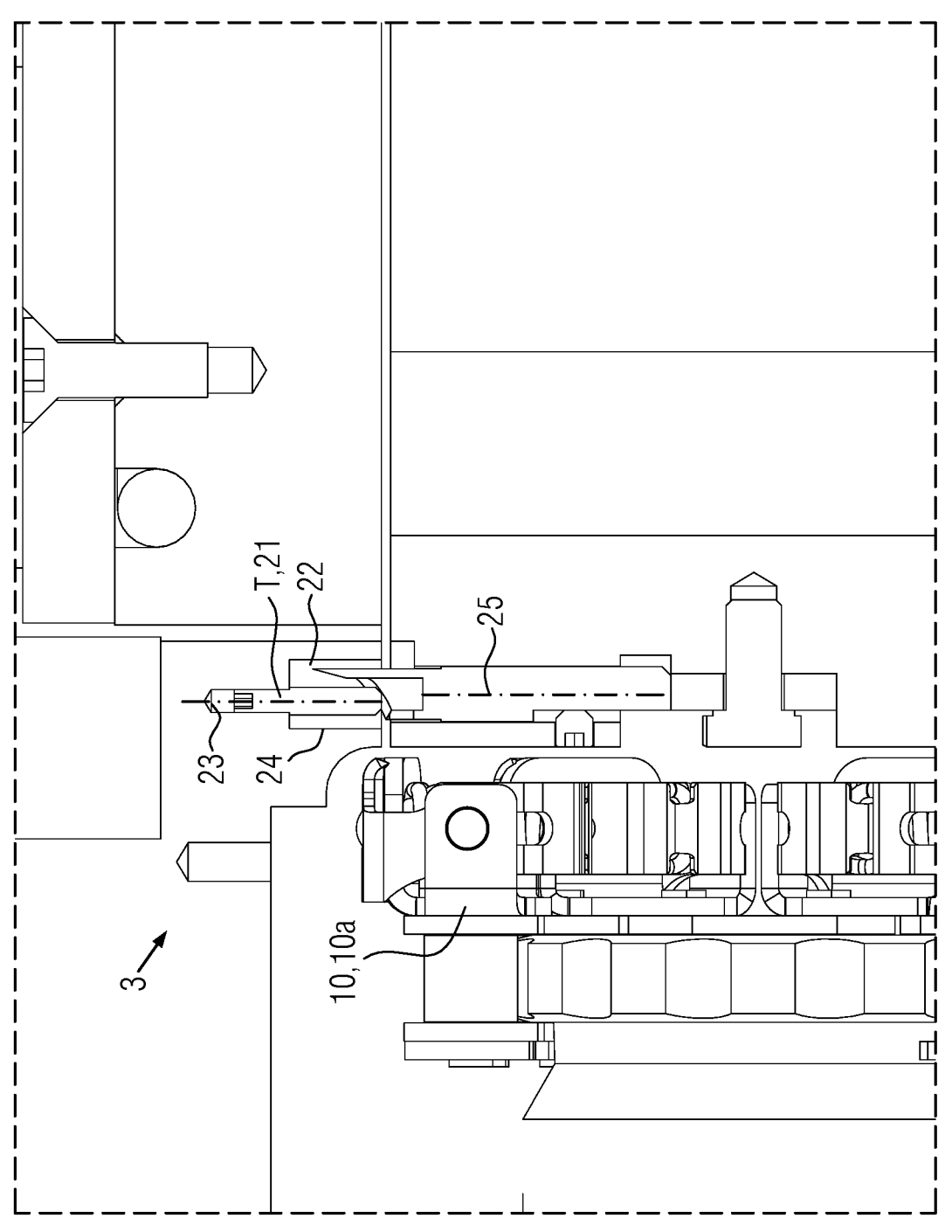
FIG. 4 shows an enlarged partial view of the forming station.

FIG. 4 shows an enlarged partial view of the forming station 3. A portion T of the hold-down device 21 extends into the cavity 22. It can be seen here that a central axis 23 of the hold-down device 21 is arranged closer to an outer edge 24 of the cavity 22 than a central axis 25 of the cavity 22.

Figure 5:
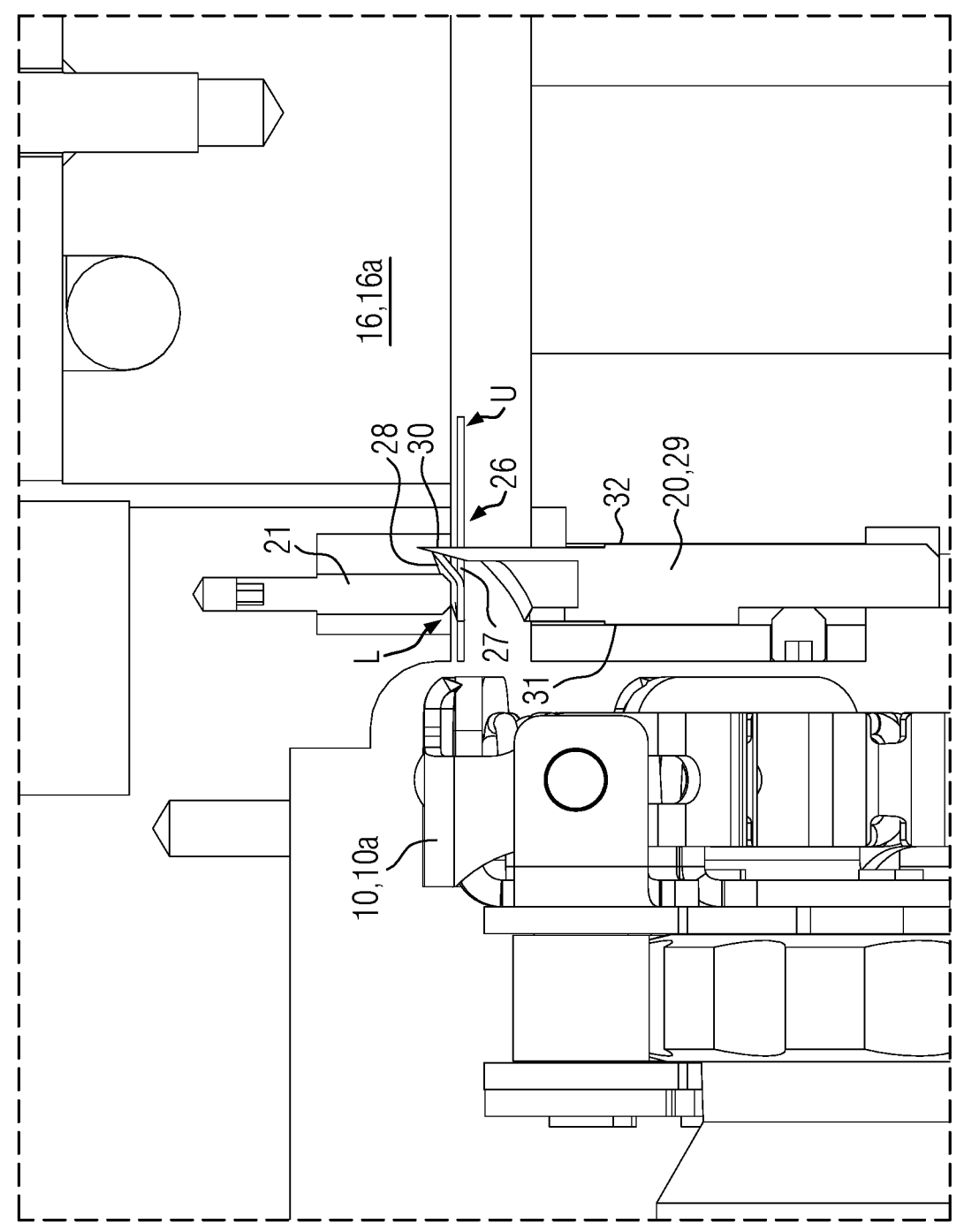
FIG. 5 shows an enlarged partial view of the forming station with a punched lower film.

FIG. 5 shows another enlarged partial view of the forming station 3 and a punched lower film U. The perforation L is located on an edge strip area 26 of the lower film U. The perforation L includes an aperture 27 and a tab 28 formed at the aperture 27. The geometry of the punch 20 and the punched lower film U is explained in more detail below in FIG. 8.

The punch 20 has a punch body 29 and a pointed cutting blade 30. The punch body 29 has an outer edge area 31 facing the lateral transport chain 10 (in FIG. 5, one of the lateral transport chains 10 is the first lateral transport chain 10a) and an inner edge area 32 facing the heating body 16 (in FIG. 5, the heating body 16 is the heating plate 16a). When viewed in cross-section, the hold-down device 21 is arranged between one of the lateral transport chains 10 (in FIG. 5, one of the lateral transport chains 10 is the first lateral transport chain 10a) and the heating body 16 (in FIG. 5, the heating body 16 is the heating plate 16a). It can be seen here that the hold-down device 21 is positioned further offset towards the outer edge area 31 of the punch body 29 than towards the inner edge area 32 of the punch body 29.

Figures 6, 7, 8:
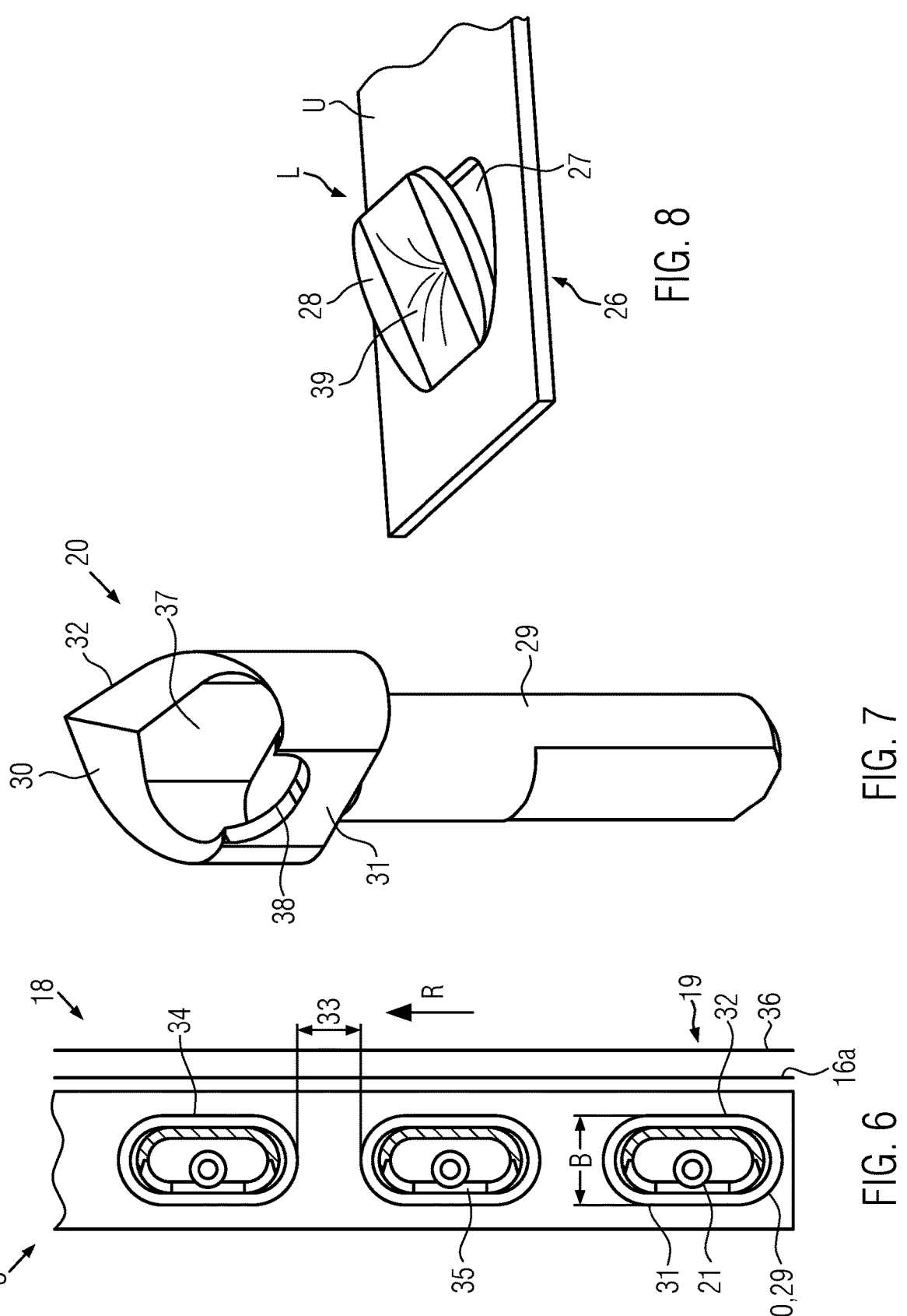
FIG. 6 shows a schematic top view of the punching device.
FIG. 7 shows a perspective view of the punch.
FIG. 8 shows a schematic view of a lower film punched by means of the punch.

FIG. 6 shows a schematic top view of the punching device 18. Several punching units 19 are provided in the punching device 18, positioned at equal distances 33 from each other in the working direction R. The punching units 19 are arranged in the same way as the punching device 18. The distances 33 between the punch units 19 can be 20 mm. The punch body 29 has a partially elliptical cross-sectional shape 34. The punch body 29 has a recess 35. The recess 35 is described in more detail in FIG. 8.

In FIG. 6, it can also be seen that the hold-down device 21 is positioned further toward the outer edge area 31 of the punch body 29 than toward the inner edge area 32 of the punch body 29. This outward displacement of the hold-down device 21 makes it possible to make the punch body 29 narrower transversely to the working direction R. A width B of the cross-sectional shape 34 is 5.5 mm in this embodiment. The heating plate 16a of the forming station 3 extends approximately 3 mm beyond a longitudinal cut 36 in the lower film U, as shown in FIG. 6.

FIG. 7 shows a schematic view of the punch 20. The punch 20 has a depression 37 which is at least partially surrounded by the punch body 29. The outer edge area 31 of the punch body 29 has a recess 38 for the hold-down device 21 (not shown). It can be seen in FIG. 7 that the pointed cutting blade 30 is provided on the inner edge area 32 of the punch body 29. The pointed cutting blade 30 extends from the inner edge area 32 of the punch body 29 to the recess 38 of the outer edge area 31. During a punching stroke performed by means of the punching device 18, the pointed cutting blade 30 cuts a part of the lower film U to form apertures 27 (see FIG. 8). Part of the hold-down device 21 (not shown) positioned above the lower film U immerses into the recess 38.

FIG. 8 shows a schematic view of a punched lower film U with the aperture 27 formed at the edge strip area 26 and a tab 28 formed thereon. The tab 28 has a deformed portion 39. The deformed portion 39 has a concave or V-shaped shape. This deformed portion 39 is created by the immersion of the hold-down device 21 into the recess 38 of the punch 20, and ensures that the tab 28 remains stable and upstanding so that the aperture 27 can be reliably punched for an evacuation and/or gassing process within the downstream sealing station 4.

What is claimed is:

1. A deep-drawing packaging machine comprising a work station for heating a lower film for a forming process in which a trough is formed in the lower film, and lateral transport chains configured to grip the lower film laterally at an input of the deep-drawing packaging machine and to transport the lower film intermittently through the work station in a working direction, wherein the work station comprises a height-adjustable tool lower part, a tool upper part positioned above the tool lower part and including a heating body for heating the lower film, and a punching device including a punching unit for producing a perforation in an edge strip area of the lower film configured to allow for an atmosphere to be exchanged in the trough during an evacuation process or a gassing process at a scaling station located downstream from the work station in the working direction, wherein the punching unit comprises a punch provided on the tool lower part and a hold-down device configured to interact with the punch and provided on the tool upper part, wherein the punch has a punch body with an outer edge area facing one of the lateral transport chains and with an inner edge area facing the heating body, wherein the hold-down device is at least partially arranged between the one lateral transport chain and the heating body, and wherein the hold-down device is positioned further towards the outer edge area of the punch body than towards the inner edge area of the punch body.

2. The deep-drawing packaging machine according to claim 1, wherein the tool upper part defines a cavity into which at least a part of the hold-down device extends, wherein a central axis of the hold-down device is arranged closer to an outer edge of the cavity than a central axis of the cavity.

3. The deep-drawing packaging machine according to claim 1, wherein the punch has a depression which is at least partially surrounded by the punch body.

4. The deep-drawing packaging machine according to claim 1, wherein the outer edge area of the punch body has a recess for the hold-down device.

5. The deep-drawing packaging machine according to claim 4, wherein the inner edge area of the punch body has a pointed cutting blade extending to the recess of the outer edge area.

6. The deep-drawing packaging machine according to claim 1, wherein the punch body has an oval or elliptical cross-sectional shape.

7. The deep-drawing packaging machine according to claim 6, wherein the cross-sectional shape has a width of 3 to 6 mm.

8. The deep-drawing packaging machine according to claim 1, wherein the work station is a forming station for forming the trough in the lower film.

9. The deep-drawing packaging machine according to claim 1, wherein the work station is a preheating station for heating the lower film, and wherein the deep-drawing packaging machine further comprises a forming station positioned downstream of the preheating station in the working direction.

10. The deep-drawing packaging machine according to claim 1, wherein the heating body comprises a rectangular heating plate.

11. The deep-drawing packaging machine according to claim 1, wherein the punching device comprises a plurality of the punching units positioned at equal distances from one another in the working direction.

12. The deep-drawing packaging machine according to claim 1, wherein the deep-drawing packaging machine comprises a longitudinal cutting device for producing a laterally positioned, longitudinal cut in the lower film, wherein the heating body of the work station is dimensioned such that the lower film can be heated beyond the laterally positioned, longitudinal cut.

13. The deep drawing packaging machine according to claim 1, wherein the tool lower part and the tool upper part are configured to form the trough in the lower film.

14. The deep drawing packaging machine according to claim 1, further comprising a lifting device configured to move the tool lower part with respect to the tool upper part to enable the forming process to take place at the work station.

15. The deep drawing packaging machine according to claim 14, wherein the outer edge area of the punch body has a recess for the hold-down device.

16. The deep-drawing packaging machine according to claim 15, wherein the punching device comprises a plurality of the punching units spaced apart from one another in the working direction.

17. A method on a deep-drawing packaging machine for producing a perforation with a plurality of elongated apertures in a working direction of the deep-drawing packaging machine in an edge strip area of a lower film fed to a work station of the deep-drawing packaging machine by lateral transport chains in the working direction, the method comprising forming the perforation in the edge strip area of the lower film by a punching device integrated within the work station, wherein the perforation is configured to allow for an atmosphere to be exchanged in a trough formed in the lower film during an evacuation process or a gassing process at a sealing station located downstream from the work station.

18. The method according to claim 17, wherein, during a punching stroke carried out by the punching device, a hold-down device of the punching device positioned above the lower film immerses at least partially into a recess of a punch positioned below the lower film, so that deformed tabs erected outwardly towards the transport chains are formed at the respective apertures.

19. A method on a deep-drawing packaging machine for producing a perforation in a working direction of the deep-drawing packaging machine in an edge strip area of a lower film, the method comprising:

feeding the lower film to a work station of the deep-drawing packaging machine in the working direction; and forming the perforation in the edge strip area of the lower film by a punching device integrated within the work station, wherein the perforation is configured to allow for an atmosphere to be exchanged in a trough formed in the lower film during an evacuation process or a gassing process at a scaling station located downstream from the work station.

20. The method according to claim 19, wherein, during a punching stroke carried out by the punching device, a hold-down device of the punching device positioned above the lower film immerses at least partially into a recess of a punch positioned below the lower film, so that deformed tabs erected outwardly are formed at the respective apertures.

\* \* \* \* \*